United States Patent
Sullivan et al.

(10) Patent No.: US 10,033,699 B2
(45) Date of Patent: Jul. 24, 2018

(54) TRANSPARENT DNSSEC-SIGNING PROXY

(71) Applicant: CLOUDFLARE, INC., San Francisco, CA (US)

(72) Inventors: Nicholas Thomas Sullivan, San Francisco, CA (US); Olafur Gudmundsson, Chevy Chase, MD (US); Filippo Valsorda, Tortona (IT)

(73) Assignee: CLOUDFLARE, INC., San Francisco, CA (US)

( * ) Notice: Subject to any disclaimer, the term of this patent is extended or adjusted under 35 U.S.C. 154(b) by 25 days.

(21) Appl. No.: 15/148,867

(22) Filed: May 6, 2016

(65) Prior Publication Data

US 2016/0330174 A1    Nov. 10, 2016

Related U.S. Application Data

(60) Provisional application No. 62/159,212, filed on May 8, 2015.

(51) Int. Cl.
*H04L 29/06* (2006.01)
*H04L 29/12* (2006.01)
*H04L 29/08* (2006.01)

(52) U.S. Cl.
CPC ...... *H04L 63/0281* (2013.01); *H04L 61/1511* (2013.01); *H04L 63/12* (2013.01); *H04L 67/2819* (2013.01)

(58) Field of Classification Search
CPC .......................... H04L 63/0281; H04L 61/1511
See application file for complete search history.

(56) References Cited

U.S. PATENT DOCUMENTS

| | | | |
|---|---|---|---|
| 6,119,234 A | 9/2000 | Aziz et al. | |
| 8,347,100 B1 * | 1/2013 | Thornewell | H04L 9/3247 713/176 |
| 8,645,700 B2 | 2/2014 | Smith et al. | |
| 8,886,750 B1 | 11/2014 | Mutz et al. | |
| 9,106,699 B2 | 8/2015 | Thornewell et al. | |
| 9,130,917 B2 | 9/2015 | Smith et al. | |
| 9,338,182 B2 | 5/2016 | Devarapalli et al. | |
| 9,596,266 B1 | 3/2017 | Coleman et al. | |
| 9,705,682 B2 | 7/2017 | Kaliski, Jr. et al. | |
| 9,705,851 B2 | 7/2017 | Kaliski, Jr. et al. | |
| 2002/0124060 A1 | 9/2002 | Jinzaki | |
| 2004/0039798 A1 | 2/2004 | Hotz et al. | |

(Continued)

OTHER PUBLICATIONS

R. Bellis, "DNS Proxy Implementation Guidelines", Aug. 2009, Network Working Group, Request for Comments: 5625, retrieved from the Internet <https://tools.ietf.org/pdf/rfc5625.pdf>, retrieved on Aug. 1, 2016.*

(Continued)

*Primary Examiner* — Farid Homayounmehr
*Assistant Examiner* — Zhimei Zhu
(74) *Attorney, Agent, or Firm* — Nicholson De Vos Webster & Elliott LLP

(57) ABSTRACT

A first DNS server receives, from a client device, a DNS query for a domain name and transmits, to a second DNS server, the DNS query for the domain name. The first DNS server receives, from the second DNS server, an answer to the DNS query that is unsigned. The first DNS server signs the received answer to the DNS query and transmits, to the client device, the signed DNS answer.

3 Claims, 3 Drawing Sheets

(56) References Cited

U.S. PATENT DOCUMENTS

| | | |
|---|---|---|
| 2004/0044791 A1 | 3/2004 | Pouzzner |
| 2006/0253612 A1 | 11/2006 | Cheshire |
| 2006/0268802 A1 | 11/2006 | Faccin |
| 2007/0283028 A1 | 12/2007 | Gilroy et al. |
| 2008/0189437 A1 | 8/2008 | Halley |
| 2010/0005146 A1 | 1/2010 | Drako et al. |
| 2010/0106833 A1 | 4/2010 | Banerjee et al. |
| 2011/0035469 A1 | 2/2011 | Smith et al. |
| 2011/0153831 A1 | 6/2011 | Mutnuru et al. |
| 2012/0117379 A1 | 5/2012 | Thornewell et al. |
| 2012/0117621 A1* | 5/2012 | Kondamuru ...... H04L 29/12066 726/3 |
| 2012/0155646 A1* | 6/2012 | Seshadri ................ H04L 9/083 380/279 |
| 2012/0278626 A1 | 11/2012 | Smith et al. |
| 2012/0284505 A1 | 11/2012 | Smith et al. |
| 2012/0331524 A1 | 12/2012 | Mower et al. |
| 2013/0124685 A1 | 5/2013 | Keitel et al. |
| 2013/0204978 A1* | 8/2013 | Fleischman ......... H04L 61/1511 709/219 |
| 2013/0268673 A1* | 10/2013 | Graham-Cumming ........... H04L 67/2828 709/226 |
| 2014/0173134 A1 | 6/2014 | Choquette et al. |
| 2014/0222906 A1 | 8/2014 | Isler et al. |
| 2014/0280305 A1 | 9/2014 | James et al. |
| 2014/0344925 A1 | 11/2014 | Muthiah |
| 2015/0058999 A1 | 2/2015 | McPherson et al. |
| 2015/0117624 A1 | 4/2015 | Rosenshine |
| 2015/0295882 A1 | 10/2015 | Kaliski, Jr. |
| 2015/0312100 A1 | 10/2015 | Chan et al. |
| 2015/0381558 A1 | 12/2015 | Tuliani |
| 2016/0197898 A1* | 7/2016 | Hozza ................ H04L 63/0442 713/168 |
| 2016/0261750 A1 | 9/2016 | Tubi et al. |
| 2016/0301656 A1 | 10/2016 | Akcin |
| 2016/0308818 A1 | 10/2016 | Torres et al. |
| 2016/0330174 A1 | 11/2016 | Sullivan et al. |
| 2017/0324724 A1 | 11/2017 | Smith et al. |
| 2018/0007090 A1 | 1/2018 | Cao et al. |

OTHER PUBLICATIONS

Cathy Almond, "DNSSEC validation and BIND9 cache", Feb. 5, 2014, retrieved online from <https://deepthought.isc.org/article/AA-00912/205/DNSSEC-validation-and-BIND9-cache.html>, retrieved on Nov. 13, 2017.*
R. Arends, et al., DNS Security Introduction and Requirements, Network Working Group, Request for Comments: 4033, Mar. 2005, 21 pages.
R. Arends, et al., Resource Records for the DNS Security Extensions, Network Working Group, Request for Comments: 4034, Mar. 2005, 29 pages.
R. Arends et al., Protocol Modifications for the DNS Security Extensions, Network Working Group, Request for Comments: 4035, Mar. 2005, 53 pages.
J. Schlyter, "DNS Security (DNSSEC) NexISECure (NSEC) RData Format," Networking Working Group, RFC 3845, Aug. 2004, pp. 1-7.
Non-Final Office Action for U.S. Appl. No. 15/148,856, dated Sep. 16, 2016, 20 pages.
Notice of Allowance for U.S. Appl. No. 15/148,856, dated Mar. 27, 2017, 13 pages.
Bau J., et al., "A security Evaluation of DNSSEC with NSEC 3," Mar. 2, 2010, 18 pages.
Chetioui K., et al., "Security of the DNS Protocol: Implementation & Weaknesses Analyses of Dnssec," IJCSI International Journal of Computer Science Issues, vol. 9, Issue 2, No. 3, Mar. 2012, pp. 340-345.
Goldberg S., et al., "NSEC 5: Provably Preventing DNSSEC Zone Enumeration," Oct. 17, 2014, pp. 1-8.
Notice of Allowance from U.S. Appl. No. 15/148,856, dated Feb. 14, 2018, 24 pages.
Notice of Allowance from U.S. Appl. No. 15/148,856, dated Sep. 6, 2017, 14 pages.
RFC 7129: Giben R., et al., "Authenticated Denial of Existence in DNS," Request for Comments: 7129, Feb. 2014, pp. 1-30.

* cited by examiner

TRANSPARENT DNSSEC-SIGNING PROXY

CROSS-REFERENCE TO RELATED APPLICATIONS

This application claims the benefit of U.S. Provisional Application No. 62/159,212, filed May 8, 2015, which is hereby incorporated by reference.

FIELD

Embodiments of the invention relate to the field of secure network communications; and more specifically, to a transparent DNSSEC-signing proxy.

BACKGROUND

Domain Name System Security Extensions (DNSSEC) is a set of security extensions to DNS that provides a way for authenticating DNS records. DNSSEC is defined by the IETF in RFCs 4033, 4034, and 4035. Each answer from a DNS SEC protected zone is digitally signed. DNSSEC provides a way for DNS records to be trusted by whoever receives them. DNSSEC uses public key cryptography to ensure that DNS records are authentic. DNSSEC not only allows a DNS server to prove the authenticity of the records it returns, it also allows the assertion of "non-existence of records". The DNSSEC trust chain is a sequence of records that identify either a public key or a signature of a set of resource records. The root of this chain of trust is the root key which is maintained and managed by the operators of the DNS root.

Several record types are defined by DNSSEC including DNS public key (DNSKEY), delegation signer (DS), and resource record digital signature (RRSIG). The DNSKEY record type is a public key used to sign a set of resource records (RRset). The DS record type is a delegation signer (a hash of a key). The RRSIG record type is a signature of a RRset that shares name/type/class. The DNSKEY can be classified into two roles, which can be handled by separate keys or a single key. For example, a key signing key (KSK) can be used to sign DNS KEY records. A zone signing key (ZSK) can be used to sign all other records in the domain in which it is authoritative for.

The set of all records of a given type for a domain name is called an RRset. An RRSIG (Resource Record SIGnature) is essentially a digital signature for an RRset. Each RRSIG is associated with a DNSKEY. The RRset of DNSKEYs are signed with the key signing key (KSK). All others are signed with the zone signing key (ZSK). Trust is conferred from the DNSKEY to the record though the RRSIG: if you trust a DNSKEY, then you can trust the records that are correctly signed by that key.

However, the domain's KSK is signed by itself, making it difficult to trust. The way around this is to walk the domain up to the next/parent zone. To verify that the DNSKEY for example.com is valid, you have to ask the .com authoritative server. This is where the DS record comes into play: it acts as a bridge of trust to the parent level of the DNS.

The DS record is a hash of a DNSKEY. The .com zone stores this record for each zone that has supplied DNSSEC keying information. The DS record is part of an RRset in the zone for .com and therefore has an associated RRSIG. This time, the RRset is signed by the .com ZSK. The .com DNSKEY RRset is signed by the .com KSK.

The ultimate root of trust is the KSK DNSKEY for the DNS root. This key is universally known and published. By following the chain of DNSKEY, DS and RRSIG records to the root, any record can be trusted.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for a transparent DNSSEC-signing proxy is described. In one embodiment, a DNS system proxy acts as a DNS proxy for one or more origin DNS servers. The DNS system proxy can transparently sign answers from the origin DNS server before sending the results to the client.

Figure 1:
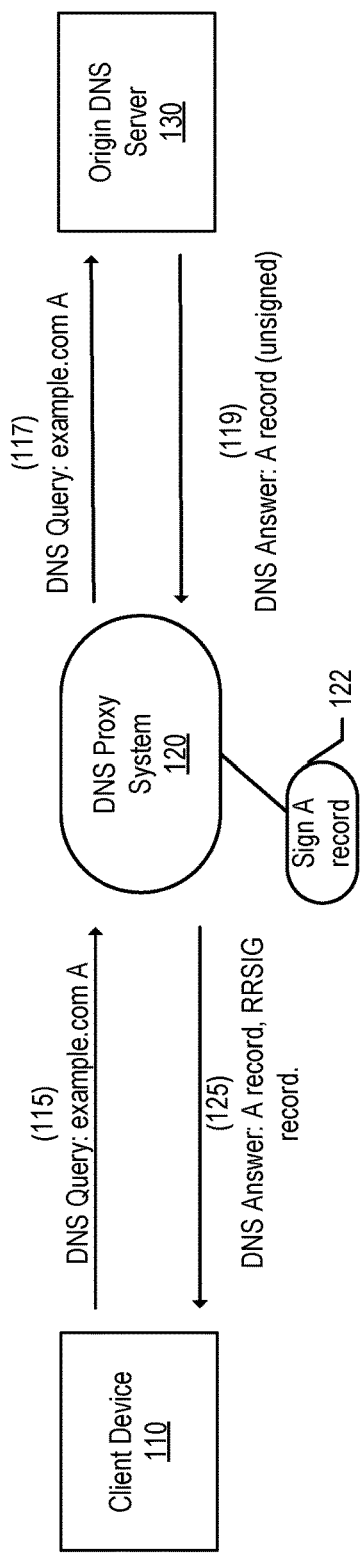
FIG. 1 illustrates an exemplary system according to some embodiments described herein.

FIG. 1 illustrates an exemplary system according to some embodiments described herein. The client device 110 is a device that queries DNS and may be a desktop computer, a laptop computer, a smartphone, or other device that makes DNS queries. The client device may include client programs that access the Internet such as a web browser or email application. For example, a user may input a domain name into the address bar of their browser (e.g., http://example.com) to access that page, which causes the browser to make a request for the IP address mapped to that domain name. It should be understood that the use of the term "client device" herein does not require that the device be an end-user client device.

The client device 110 makes DNS queries that are received by the DNS proxy system 120 on behalf of the origin DNS server 130. For example, the origin DNS server 130 may be the origin DNS server for the domain example-.com. The DNS proxy system 120 may receive the DNS queries for the domain example.com as a result of the name server of the origin DNS server 130 being changed to point to a server of the DNS proxy system 120. The DNS proxy system 120 may be provided as a service and not owned and/or operated by the origin(s) provided by the origin DNS server 130. Although not illustrated in FIG. 1, the DNS proxy system 120 may cache DNS responses and, if available in cache, will return those responses to the requesters thereby saving bandwidth at the origin DNS server 130. If the DNS response is not available in cache, the DNS proxy system 120 queries the origin DNS server 130 to fetch the proper DNS response and returns the result back to the requester. This response is then cached so that it is available to be returned when the next query for the record is received.

The DNS proxy system 120 may not have a complete understanding of the zones provided by the origin DNS server 130. For instance, the DNS proxy system 120 may not, at the time of its request, know the type of records available in the DNS records of the origin DNS server 130 for a particular domain name.

In the example shown in FIG. 1, the client device 110 transmits a DNS query 115 for an A record type for the domain name example.com. This DNS query 115 is received by the DNS proxy system 120. Assuming that the DNS proxy system 120 does not have the appropriate DNS response in its cache, the DNS proxy system 120 transmits the DNS query 117 to the origin DNS server 130 for the domain name example.com that requests the A record for the domain name example.com. The origin DNS server 130 transmits a DNS response 119 that includes the DNS response with the appropriate A record to the DNS proxy system 120. The DNS response 119 is unsigned (not supported by DNSSEC). The DNS proxy system 120 receives the response and, at operation 122, signs the DNS answer. For example, the DNS proxy system 120 generates an RRSIG record that includes the signature of the A record returned by the origin DNS server 130. The DNS proxy system 120 transmits the DNS answer 125 to the client device 110 that includes the signed response (e.g., an A record and an RRSIG record). The DNS proxy system 120 may cache the A record and the generated RRSIG record so that it is available to be returned when the next query for the record is received.

In one embodiment, the DNS proxy system provider creates and manages the keys necessary to support the signing of the resource records. For example, the DNS proxy system 120 creates and manages the DNSKEY and DS records for generating the signatures. The DNS proxy system 120 may expose these keys to the origin DNS server provider so that the origin DNS server can present the DNSKEY and/or DS records to their customers if requested.

In one embodiment, this technique allows the DNS proxy system provider's customers (e.g., the owner/operator of the origin DNS server 130) to not change anything in its settings yet get the benefit of turning their unsigned answers into signed ones seamlessly before sending them to the client. All the zones hosted by the customer (owner/operator of the origin DNS server 130) can be signed by the DNS proxy system without the zone owner involvement (with the exception for DS record insertion, if desired).

Figure 2:
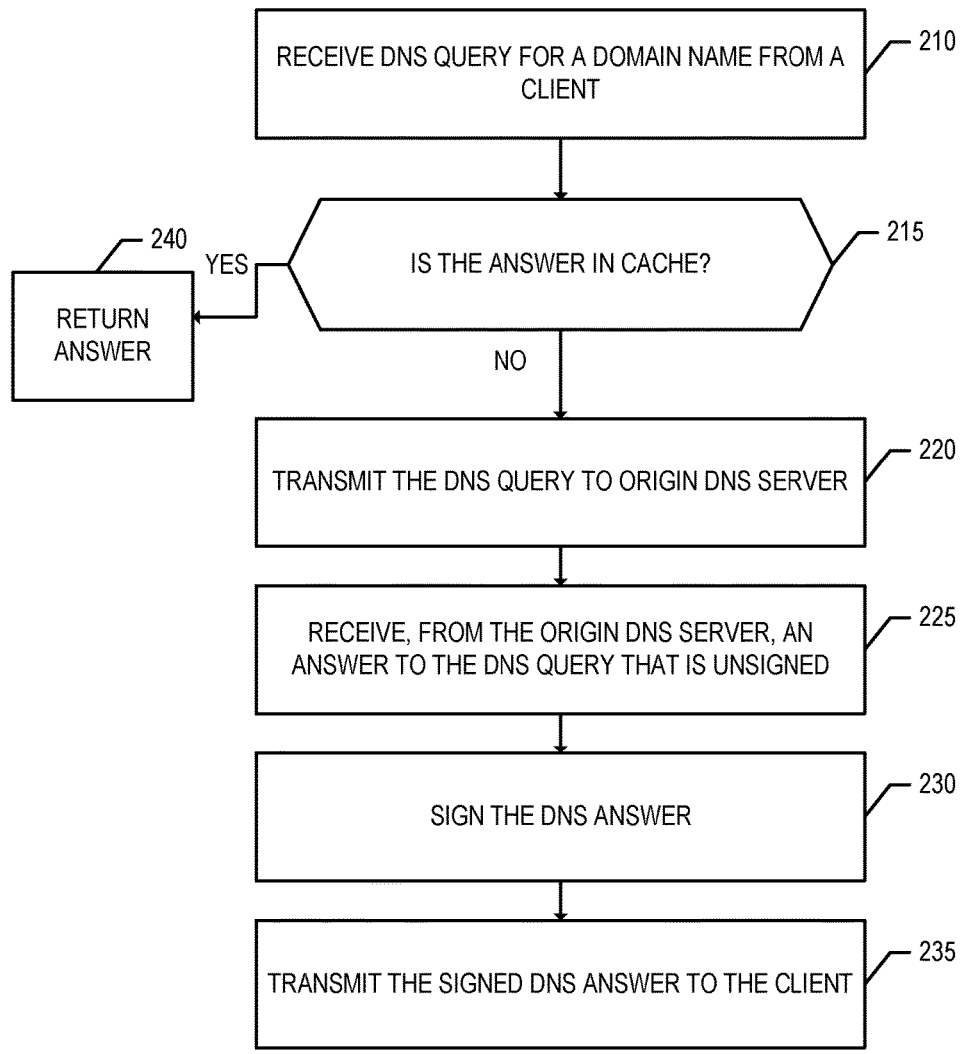
FIG. 2 is a flow diagram that illustrates exemplary operations according to some embodiments described herein.

FIG. 2 is a flow diagram that illustrates exemplary operations according to some embodiments described herein. The operations of FIG. 2 will be described with respect to the embodiment described in FIG. 1. However, it should be understood that the operations of FIG. 2 can be performed by embodiments other than those described with reference to FIG. 1, and the embodiments described with reference to FIG. 1 can perform operations other than those described with reference to FIG. 2.

At operation 210, the DNS proxy system 120 receives a DNS query for a domain name from the client device 110. The DNS query may specify a particular resource record type. Flow then moves to operation 215 where the DNS proxy system 120 determines whether there is a DNS answer available in its cache. If there is, then flow moves to operation 240 where the DNS proxy system 120 returns the cached DNS answer to the client device 110. If there is not, then flow moves to operation 220 where the DNS proxy system 120 transmits the DNS query to the origin DNS server 130. Next, at operation 225, the DNS proxy system 120 receives, from the origin DNS server 130, an answer to the DNS query that is unsigned. Next, the DNS proxy system 120 signs the DNS answer at operation 230. For example, the DNS proxy system 120 generates an RRSIG record(s) that includes the signature of record set(s) returned by the origin DNS server 130. The DNS proxy system 120 transmits the DNS answer 125 to the client device 110 that includes the signed response. The DNS proxy system 120 may cache the returned record(s) and the generated RRSIG record(s) so that it is available to be returned when the next query for the record is received.

Figure 3:
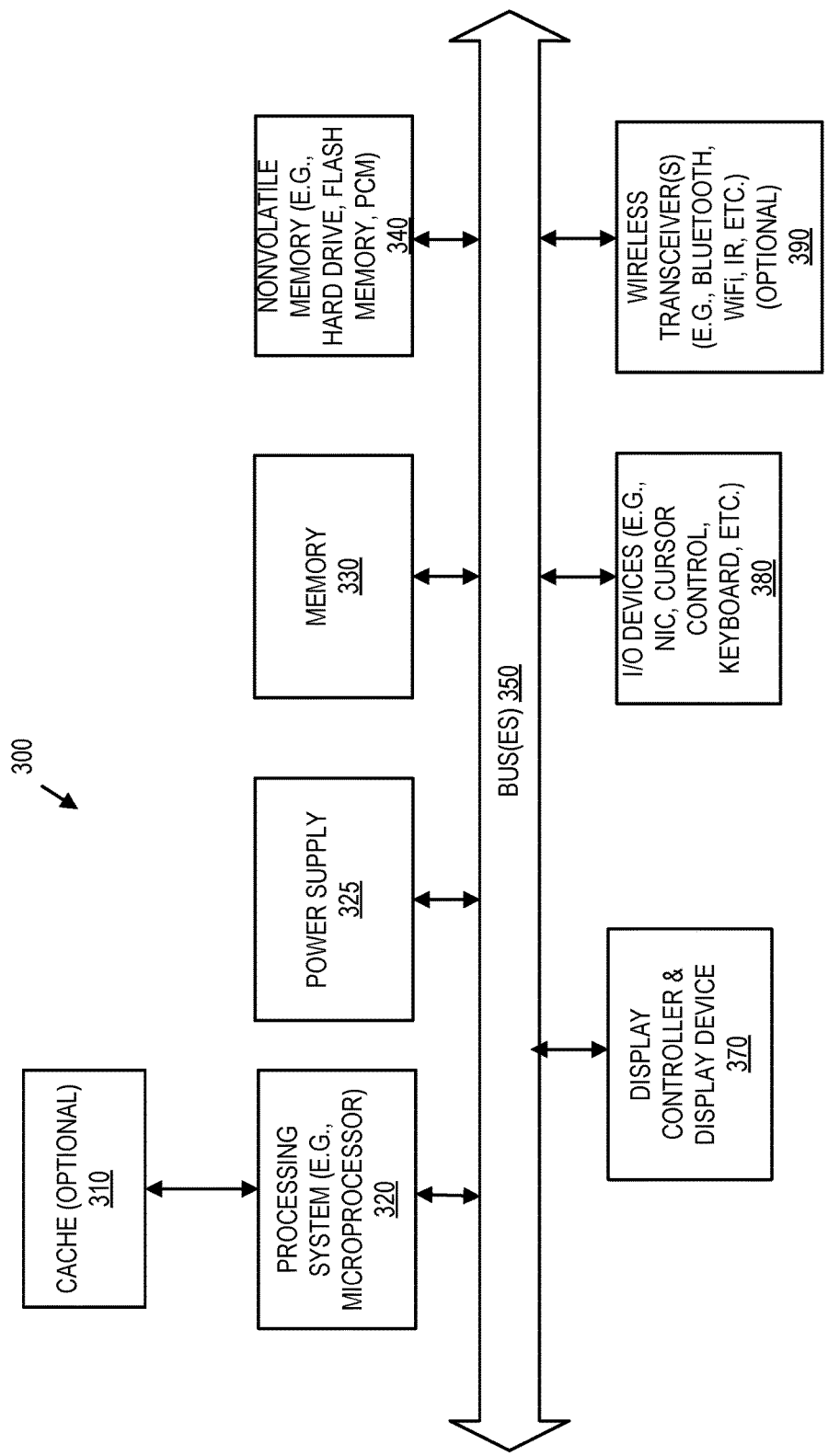
FIG. 3 illustrates an exemplary format of a computer system that may be used according to some embodiments.

As illustrated in FIG. 3, the computer system 300, which is a form of a data processing system, includes the bus(es) 350 which is coupled with the processing system 320, which may be coupled with the optional cache 310, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340, and execute the instructions to perform operations described herein. The bus(es) 350 interconnects the above components together and also interconnects those components to the display controller & display device 370, Input/Output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, WiFi, Infrared, etc.). In one embodiment, the devices and/or the domain name servers of the DNS systems described herein may take the form of the computer system 300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy Domain Name System (DNS) server, comprising:
   receiving, from a client device, a DNS query for a domain name as a result of a name server of a second DNS server being changed to point to the proxy DNS server;
   transmitting, to the second DNS server, the DNS query for the domain name;
   receiving, from the second DNS server, an answer to the DNS query that is unsigned;
   signing the received answer to the DNS query, wherein the received answer to the DNS query includes a resource record, and wherein signing the received answer to the DNS query includes generating a resource record digital signature (RRSIG) record that includes a signature of the resource record wherein signing the received answer to the DNS query includes using a private zone signing key (ZSK) managed by the proxy DNS server, and wherein the proxy DNS server creates a DNSKEY record that includes a public ZSK, the DNSKEY record further includes a public key signing key (KSK), and further comprising signing the public ZSK and the public KSK of the DNSKEY record with a private key signing key (KSK), and the proxy DNS server creates a delegate signer (DS) record from the public KSK;
   caching, at the proxy DNS server, the signed DNS answer, wherein caching the signed answer includes caching the resource record and caching the RRSIG;
   transmitting, to the client device, the signed DNS answer;
   receiving, from a second client device, a second DNS query for the domain name;
   determining that the signed DNS answer is cached; and
   responsive to determining that the signed DNS answer is cached, transmitting, to the second client device, the signed DNS answer as an answer to the second DNS query.

2. An apparatus, comprising:
   a proxy Domain Name System (DNS) server including a set of one or more processors and a set of one or more non-transitory machine-readable storage mediums storing instructions, that when executed by the set of processors, cause the set of processors to perform the following operations:
   receive, from a client device, a DNS query for a domain name as a result of a name server of a second DNS server being changed to point to the proxy DNS server;
   transmit, to a second DNS server, the DNS query for the domain name;
   receive, from the second DNS server, an answer to the DNS query that is unsigned;
   sign the received answer to the DNS query, wherein the received answer to the DNS query includes a resource record, and wherein to sign the received answer to the DNS query includes to generate a resource record digital signature (RRSIG) record that includes a signature of the resource record, wherein signing the received answer to the DNS query includes using a private zone signing key (ZSK) managed by the proxy DNS server, and wherein the proxy DNS server creates a DNSKEY record that includes a public ZSK, the DNSKEY record further includes a public key signing key (KSK), and further comprising signing the public ZSK and the public KSK of the DNSKEY record with a private key signing key (KSK), and the proxy DNS server creates a delegate signer (DS) record from the public KSK;
   cache, at the proxy DNS server, the signed DNS answer, wherein to cache the signed answer includes to cache the resource record and to cache the RRSIG;
   transmit, to the client device, the signed DNS answer;
   receive, from a second client device, a second DNS query for the domain name;
   determine that the signed DNS answer is cached; and
   responsive to determining that the signed DNS answer to the DNS query is cached, transmit, to the second client device, the signed DNS answer as an answer to the second DNS query.

3. A non-transitory machine-readable storage medium that provides instructions that, when executed by a processor of a proxy Domain Name System (DNS) server, causes said processor to perform operations comprising:
   receiving, from a client device, a DNS query for a domain name as a result of a name server of a second DNS server being changed to point to the proxy DNS server;
   transmitting, to a second DNS server, the DNS query for the domain name;
   receiving, from the second DNS server, an answer to the DNS query that is unsigned;
   signing the received answer to the DNS query, wherein the received answer to the DNS query includes a resource record, and wherein signing the received answer to the DNS query includes generating a resource record digital signature (RRSIG) record that includes a signature of the resource record wherein signing the received answer to the DNS query includes using a private zone signing key (ZSK) managed by the proxy DNS server, and wherein the proxy DNS server creates a DNSKEY record that includes a public ZSK, the DNSKEY record further includes a public key signing key (KSK), and further comprising signing the public ZSK and the public KSK of the DNSKEY record with a private key signing key (KSK), and the proxy DNS server creates a delegate signer (DS) record from the public KSK;
   caching, at the proxy DNS server, the signed DNS answer, wherein caching the signed answer includes caching the resource record and caching the RRSIG;
   transmitting, to the client device, the signed DNS answer;

receiving, from a second client device, a second DNS query for the domain name;

determining that the signed DNS answer is cached; and responsive to determining that the signed DNS answer is cached, transmitting, to the second client device, the signed DNS answer as an answer to the second DNS query.

\* \* \* \* \*